United States Patent [19]

Lim

[11] Patent Number: 5,016,104
[45] Date of Patent: May 14, 1991

[54] RECEIVER-COMPATIBLE NOISE REDUCTION SYSTEMS

[75] Inventor: Jae S. Lim, Winchester, Mass.

[73] Assignee: Massachusetts Institute of Technology, Cambridge, Mass.

[21] Appl. No.: 370,171

[22] Filed: Jun. 22, 1989

[51] Int. Cl.⁵ .................. H04N 5/213; H04N 1/419
[52] U.S. Cl. ................................. 358/167; 358/340; 358/463; 358/330
[58] Field of Search .................. 358/167, 166, 36, 37, 358/39, 328, 330, 336, 340, 426, 261.1, 463

[56] References Cited

U.S. PATENT DOCUMENTS

| | | | |
|---|---|---|---|
| 4,587,561 | 5/1986 | Kudo | 358/167 |
| 4,704,639 | 11/1987 | Yamanishi | 358/330 |
| 4,779,133 | 10/1988 | Sugimori | 358/167 |
| 4,926,261 | 5/1990 | Matsumoto | 358/167 |

OTHER PUBLICATIONS

Licklider, *Effects of Amplitude Distortion Upon the Intelligibility of Speech*, vol. 18, No. 2, pp. 171-176, 1946.
Kryter, *Premodulation Clipping in AM Voice Communication*, vol. 19, No. 1, pp. 182-188, 1947.
Wathen-Dunn et al, *On the Power Gained by Clipping Speech in the Audio Band*, vol. 30, No. 1, pp. 177-181, 1958.
Kretsinger, et al., *The Use of FAS Limiting to Improve the Intelligibility of Speech in Noise*, vol. 27, No. 1, pp. 63-69, 1960.
Thomas et al., *The Intelligibility of Filtered-Clipped Speech in Noise*, vol. 18, No. 18, pp. 193-197.
Thomas et al., *Intelligibility Enhancement Through Spectral Weighting*, IEEE, pp. 198-201, 1972.
Niederjohn et al., *The Enhancement of Speech Intelligibility in High Noise Levels by High-Pass Filtering Followed by Rapid Amplitued Compression*, IEEE, vol. ASSP-24, No. 4, 1776.
Niederjohn et al., *Speech Intelligibility Enhancement in a Power Generating Noise Enviornment*, vol. ASSP-26, No. 4, 1978.

Primary Examiner—Tommy P. Chin
Attorney, Agent, or Firm—Thomas J. Engellenner

[57] ABSTRACT

Method and systems for combatting degradation in the transmission or storage of data signals especially useful in the field of motion picture or television signal transmission, such that an advanced receiver can decode that information to provide improved picture quality, while a standard receiver will display an image with minimally visible impairments. A data signal can be decomposed into a low frequency signal and a high frequency signal, and that the high frequency signal can then be modified by the application of a series of scaling factors over selected regions in response to local variance of data values in such regions. The low frequency signal and the modified high frequency signal are then combined and transmitted (or recorded) as a modulated facsimile of the data signal, together with the scaling factors. In the advanced receiver (or playback unit), the data signal is reconstructed from the modulated facsimile with concommittant reduction in signal degradation by the application of a series of inverse scaling factors.

12 Claims, 3 Drawing Sheets

RECEIVER-COMPATIBLE NOISE REDUCTION SYSTEMS

The government has rights in this invention pursuant to grant number 8714969MIP awarded by the Natioanl Science Foundation.

BACKGROUND OF THE INVENTION

The technical field of this invention is signal processing and, in particular, noise reduction in the transmission or storage of data signals, such as broadcast motion picture or television signals.

During transmission, data signals can be degraded by various causes, such as inhomogeneities in the transmission medium and electromagnetic interference. Such channel degradation includes, for example, noise and echos, and the degradation can be observed in both one-dimensional and two-dimensional signals. For example, in conventional television broadcast signals, channel degradation is often visually perceived as poor resolution, speckles or "ghost" images. Similar problems can also arise during the storage of data on magnetic media and the like where defects in the medium or electromagnetic interference likewise result in degradation of the stored data.

In the field of television broadcasting, in particular, there is considerable interest in "extended definition television" (EDTV) systems to reduce signal degradation, as well as enhance other television features. The goal of such EDTV systems is the production of a broadcast signal that can be received with negligible loss of quality on existing home equipment but when received on an advanced receiver can produce a picture with improved resolution, aspect ratio, or sound.

Conventionally, television broadcast signals in the United States are transmitted in accordance with the National Television Systems Committee (NTSC) standards. The NTSC code provides a format whereby motion pictures (i.e., sequences of still frames) can be broadcast and reconstructed in a receiver for display in rapid succession to the viewer. There is considerable interest in adding additional information to broadcast signals in a manner that would be compatible with the NTSC format and yet permit an advanced receiver to decode the additional information.

There exists a need for extended definition television systems which can combat noise and other channel degradation effects in the transmission of television signals to provide enhanced viewing for a receiver attuned to decode advanced noise suppressing information, while also permitting viewing with a standard receiver with minimal visual disturbances. Such an extended definition system would satisfy a long-felt need in the art.

Moreover, there exists a need for better data transmission and storage systems, generally, which can suppress transmission channel and storage medium-induced noise and signal degradation.

SUMMARY OF THE INVENTION

Methods and systems for combatting degradation in the transmission or storage of data signals are disclosed, especially useful in the field of motion picture or television signal transmission, such that an advanced receiver can decode that information to provide improved picture quality, while a standard receiver will display an image with minimally visible impairments.

In particular, the present invention discloses that a data signal can be decomposed into a low frequency signal and at least one high frequency signal, and that the high frequency signal can then be modified by the application of a series of scaling factors over selected regions in response to local variance of data values in such regions. The low frequency signal and the modified high frequency signal are then combined and transmitted (or recorded) as a modulated facsimile of the data signal, together with the scaling factors. In the advanced receiver (or playback unit), the data signal is reconstructed from the modulated facsimile with concomitant reduction in signal degradation by the application of a series of inverse scaling factors.

In one illustrated embodiment, the invention includes a decomposition means for decomposing a data signal in a low frequency signal and a high frequency signal. The low pass filtering can be achieved by a convolution operation, employing an impulse response (e.g., in processing 2-dimensional data signals, a rectangular window function of $2 \times 2$ or $4 \times 4$ data values) to simply average the local neighborhood values. The decomposition means can further include a summer or other calculation means to derive the high frequency signal by subtraction of the low frequency signal from the original (unfiltered) data signal.

In another aspect of the invention, a modulating assembly is disclosed, including an adaptive scaling element which generates a series of scaling factors to be applied to different regions of the high frequency signal. The scaling element can calculate a scaling factor in response to, among other things, a measure of the busyness, or local variance, in the high frequency signal. In one illustrated embodiment, the scaling element is also responsive to the dynamic range of the low and high frequency signals to insure that the modulated facsimile of the data signal which is ultimately generated lies within a desired range.

In accordance with the invention, the modulated facsimile of the data signal is transmitted (or recorded) along with side information to permit reconstruction. In one preferred embodiment, the side information included the scaling factors and a subsampled, quantized version of the low frequency signal, which permit an advanced receiver to reconstruct the original data signal. For NTSC television systems, the side information can be hidden in unused space in the broadcast signal, for example, as digital transmissions during the horizontal or vertical blanking periods (or both).

For conventional television receivers, the result of transmission of the modulated facsimile in lieu of the actual luminance values is video of higher contrast with possible reduced dynamic range. For adaptive receivers (and playback units), the system of the present invention offers a marked improvement insofar as the application of the inverse scaling factors in the extended definition receiver (or playback unit) not only allows the reconstruction of the signal but also suppresses the channel (or storage medium) degradation effects proportionally.

The invention will next be described in connection with certain illustrated embodiments; however, it should be clear that various additions, subtractions and modifications can be made without departing from the spirit or scope of the invention. For example, the invention is not limited to luminance encoding; various other data signals of 1-dimensional, 2-dimensional or high order values can similarly be processed in accordance with teachings presented herein.

DETAIL DESCRIPTION

Figure 1:
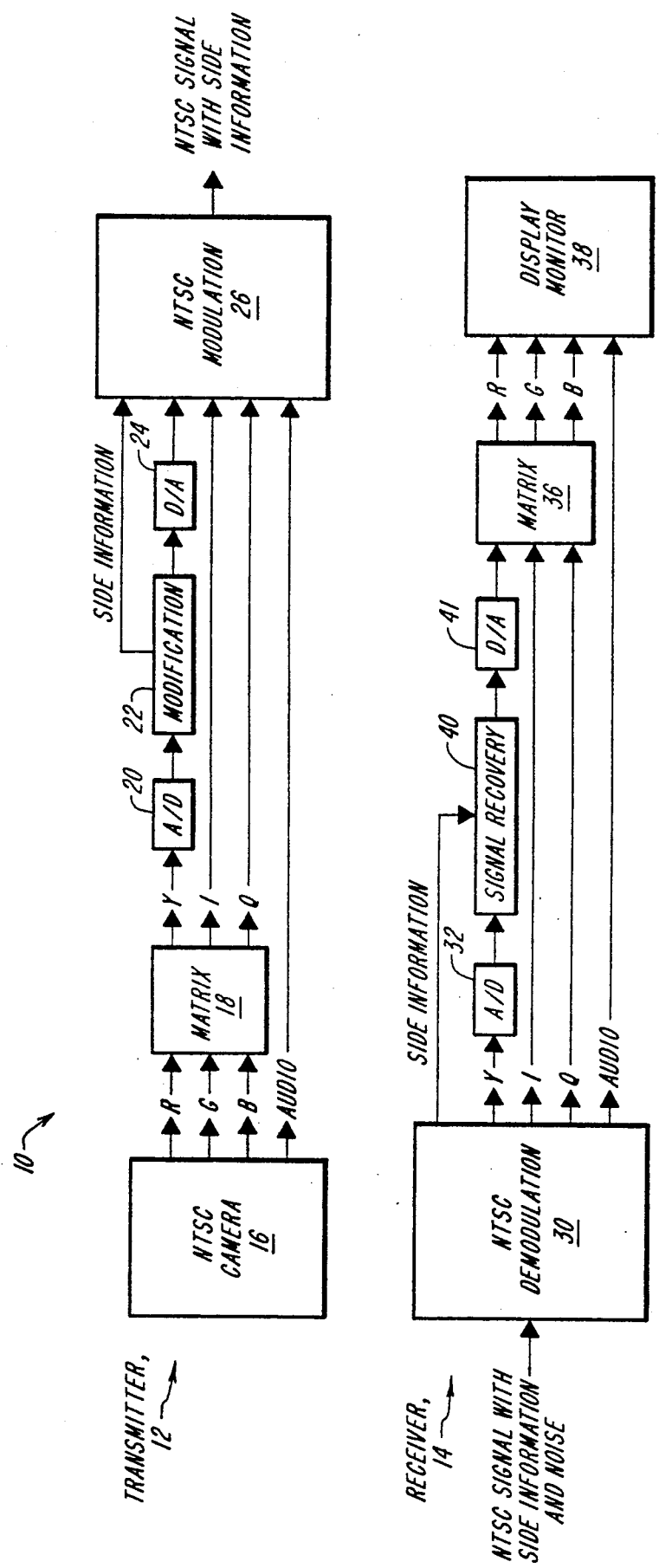
FIG. 1 is a schematic block diagram of an adaptive modulation system for television noise reduction according to the present invention.

In FIG. 1, an overall schematic diagram of an adaptive modulation system 10 for television noise reduction according to the present invention is shown, including transmitter 12 and receiver 14. In the illustrated embodiment, transmitter 12 includes a camera 16, generating color and audio signals, conversion matrix 18, for converting the color signals into luminance values (Y values) and chrominance values (I and Q values). (Alternatively, camera 16 and conversion matrix 18 can be replaced with an NTSC camera which generates Y, I, and Q values directly.) The system 10 further includes analog-to-digital converter 20 for digitizing the luminance values, luminance modification module 22, digital-to-analog converter 24 and broadcast modulator 26 generating an NTSC signal with side information. The side information is used at the receiver 14 to reconstruct an undegraded luminance signal from the transmitted modified luminance values.

Receiver 14 includes a broadcast demodulator 30 which receives the NTSC signal and decodes the Y,I and Q values, as well as the accompanying audio signal and the side information necessary for luminance reconstruction. The decoded raw luminance values are converted into a digital signal by digital-to-analog converter 32 and then employed by signal recovery module 40, together with the decoded side information to reconstruct the original luminance values with substantial suppression of channel noise. The luminance values from module 40 are reconverted into analog signals by analog-to-digital converter 41, and the luminance and chrominance values are then converted into color signals by conversion matrix 36, which can be fed, together with the audio signal, to display monitor 38 for viewing. (Alternatively, the luminance and chrominance values can be maintained in the NTSC format and can be displayed directly by an NTSC monitor.)

It will be apparent to those skilled in the art that the system 10 of FIG. 1 and the following figures can be readily adapted to also process television and other data signals for recording on a storage medium. Most generally, the methods and apparatus of the present invention can be applied to any situation where one has access to a signal prior to degradation.

Figure 2:
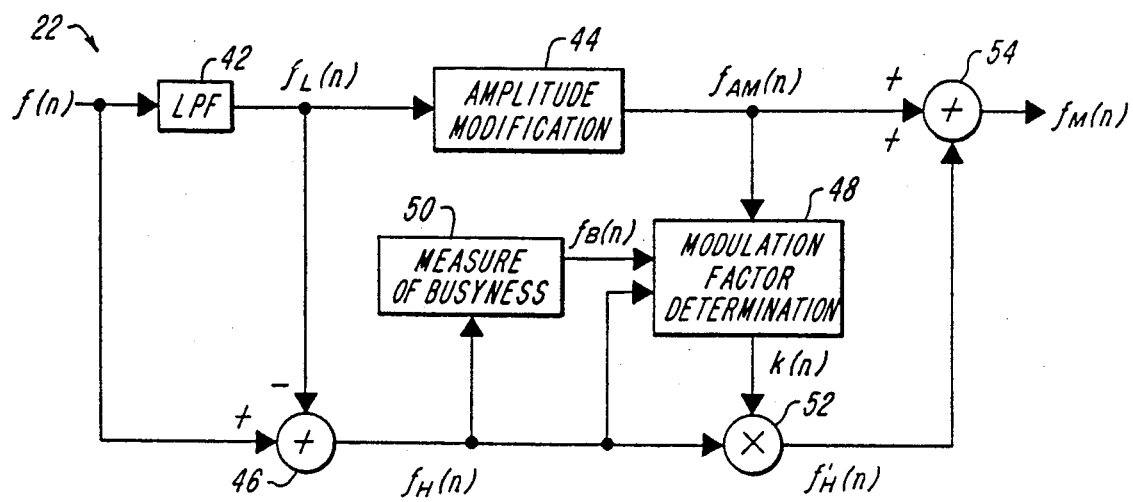
FIG. 2 is a detailed block diagram of a luminance modifying module for use in the transmitter of FIG. 1.

In FIG. 2, the luminance modification module 22 is shown in more detail, including low pass filter circuitry 42 which generates a low frequency signal $f_L(n)$ from the original luminance signal $f(n)$. (It should be appreciated that although the adaptive modification system is described in connection with luminance values, the signal $f(n)$ can represent a wide variety of data signals, and the discussion that follows is equally applicable to other signals which are subject to channel, storage medium and other forms of degradation. It should be noted that the invention applies to multi-dimensional signals even though one-dimensional signal notation is used for convenience.) The low pass filtering operation can be performed, for example, by averaging local values. Mathematically, the low frequency signal $f_L(n)$ can be obtained by a convolution operation:

$$f_L(n) = f(n) * h(n) \tag{1}$$

where $h(n)$ is the impulse response of the low pass filter. For luminance pixel values, the impulse response $h(n)$ can be a rectangular window of between $2 \times 2$ and $20 \times 20$ pixel values, when the low pass filter simply averages the local neighborhood values.

The modification module 22 can also optionally include an amplitude modifying element 44, which, though not essential to the invention, can serve to provide dynamic range compression. Thus, in some instances it may be preferable to employ amplitude modifier 44 to convert $f_L(n)$ into a compressed signal $f_{AM}(n)$, for example, using a monotonic function that maps $f_L(n)$ into $f_{AM}(n)$ so that $f_{AM}(n)$ lies in a desired dynamic range.

The luminance modification module 22 can further include a summer 46 or other computation means for deriving a high frequency signal $f_H(n)$. As shown in FIG. 2, the high frequency signal $f_H(n)$ can be obtained via summer 46 by subtracting $f_L(n)$ from the original luminance signal $f(n)$.

The modification module 22 further includes an adaptive scaling element 48, which generates a series of scaling factors $k(n)$ to be applied to the high frequency signal $f_H(n)$ over selected regions. In one preferred embodiment, the scaling element 48 calculates a scaling factor in response to, among other things, a measure of busyness signal $f_B(n)$ generated by a variance calculator 50 which measures the local variance of data values in selected regions. As illustrated in FIG. 2, the scaling factor $k(n)$ generated by adaptive scaling element 48 can also be a function of the high frequency signal $f_H(n)$, itself, and the compressed low frequency signal $f_{AM}(n)$ to insure that the luminance signal which is ultimately transmitted (or recorded), lies within a desired range. (For example, over each region a scaling factor $k$ is chosen to be as high as possible, so long as the luminance signal, which is generated remains within the dynamic range of the broadcast module.)

Again, as shown in FIG. 2, the scaling factor $k(n)$ is applied via multiplier 52 to the high frequency signal to obtain a modified high frequency signal $f'_H(n)$. The signal which is ultimately generated, $f_M(n)$ can then be obtained as the output of summer 54, which sums the compressed low frequency signal $f_{AM}(n)$ and the modified high frequency signal $f'_H(n)$ The output signal $f_M(n)$, a modulated facsimile of the original signal, is then passed to the broadcast module for transmission.

Figure 3:
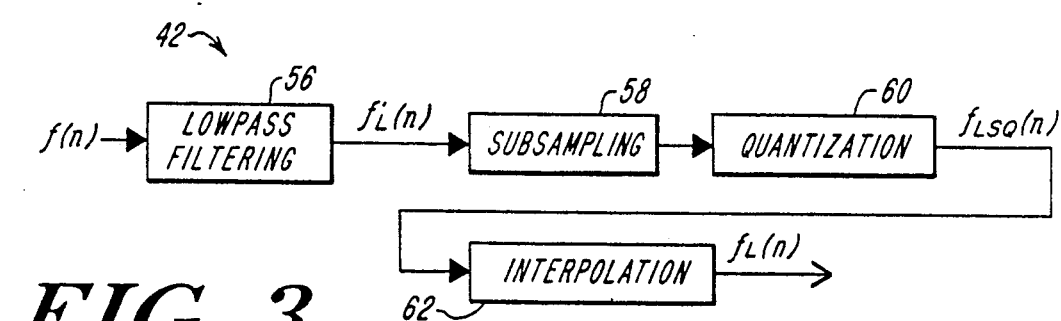
FIG. 3 is a detailed block diagram of low pass filter assembly for use in the luminance modifying module of FIG. 2.

In FIG. 3, a more detailed block diagram of the lowpass circuitry 42 of FIG. 2 is shown, including the lowpass filter element 56. As noted above, the lowpass filtering operation can be performed by averaging local values using Equation (1). In addition, the lowpass circuitry can include a subsampling element 58, quantizer 60 and interpolator 62. In FIG. 3, the output of lowpass filter 56 is a signal f'$_L$(n); and, because of the filtering operation, the signal f'$_L$(n) can be subsampled. The specific amount of subsampling will typically depend upon the degree of filtering. For example, when the lowpass filter performs local averaging over four samples (i.e., a 2×2 region), a reasonable subsampling rate would be a factor of four.

The subsampled signal is quantized by quantizer 60. The number of bits assigned depends on the application. In typical applications, the number of bits assigned is in the range of about 4–10 bits/sample. In television broadcast embodiments, this quantized low frequency signal, f$_{LSQ}$(n), can be used as side information, transmitted in an empty region of the NTSC spectrum and/or in vertical and horizontal blanking periods, and employed by an extended definition television receiver to recover the original luminance signal. By transmitting the subsampled, quantized data values f$_{LSQ}$(n) along with the picture, the EDTV receiver can independently reconstruct f$_L$(n), the lowpassed signal.

Finally, in FIG. 3, interpolator 62 interpolates f$_{LSQ}$(n) to approximate f'$_L$(n). One method of interpolation which can be used is bilinear interpolation. The output of the interpolator 62 is the low frequency signal f$_L$(n) which is summed with the modified high frequency signal f'$_H$(n) as discussed above in connection with FIG. 2 to obtain the signal f$_M$(n) which is ultimately broadcast.

Figure 4:
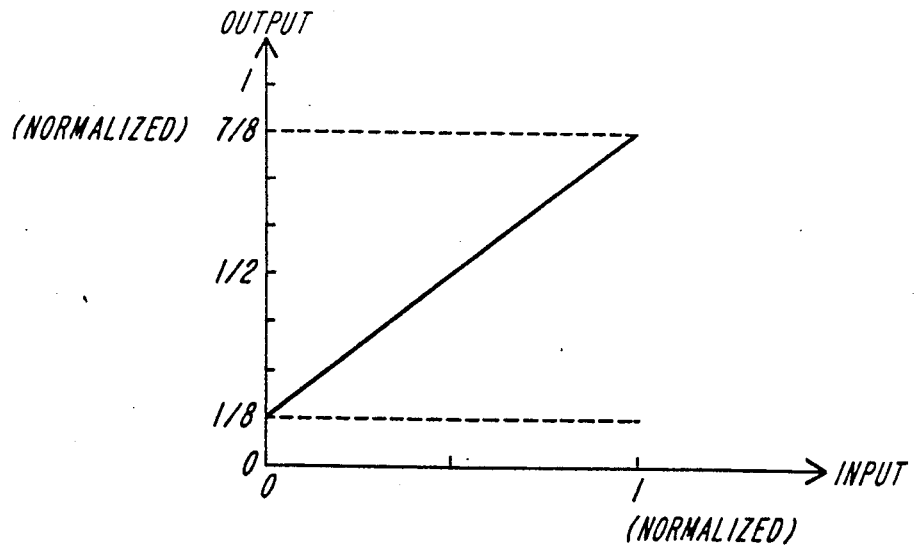
FIG. 4 is a graph of input and output values illustrating an exemplary amplitude modification function which can be implemented by the amplitude modifying assembly of FIG. 2.

FIG. 4 is a graph exemplifying the operation of the amplitude modifier 44 of FIG. 2. The amplitude modifier receives the output of the lowpass filter circuitry and modifies the dynamic range of f$_L$(n) to a more desirable dynamic range. For example, as illustrated in FIG. 4, this range can be between ⅛ and ⅝ of the original signal range.

More generally, if f$_L$(n) is in the range of $$I_{MIN} \leq f_L(n) \leq I_{MAX} \qquad (2)$$

and the desired dynamic range of f$_{AM}$(n) is $$O_{MIN} \leq f_{AM}(n) \leq O_{MAX} \qquad (3)$$

then a monotonic function can be employed to map f$_L$(n) into f$_{AM}$(n). One example of such a function is the following:

$$f_{AM}(n) = af_L(n) + b \qquad (4)$$

where $a = \dfrac{O_{MAX} - O_{MIN}}{I_{MAX} - I_{MIN}}$ and $b = O_{MIN} - aI_{MIN}$ It should be appreciated that the choice of O$_{MIN}$ and O$_{MAX}$ need not be fixed and can be made to adapt to signal characteristics.

Figure 5:
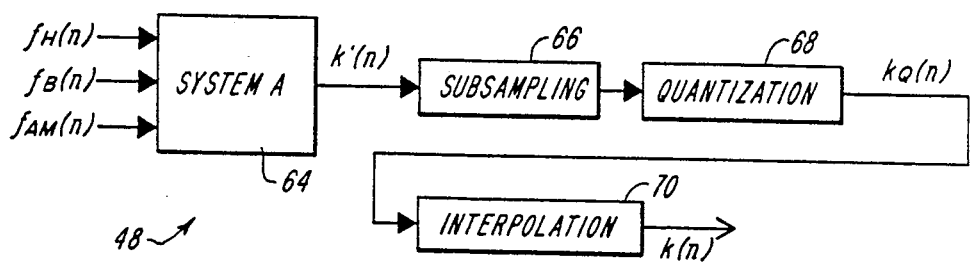
FIG. 5 is a detailed block diagram of modulation assembly for use in the luminance modifying module of FIG. 2.

In FIG. 5, a more detailed illustration of a modulation factor determination module 48 is presented, including a scaling element 64, subsampling element 66, quantizer 68 and interpolator 70. In the scaling element 64, a scaling factor k(n) is selected based upon the values of f$_H$(n), f$_B$(n) and f$_{AM}$(n). For example, the modulation factor k(n) can be chosen to satisfy the following conditions:

i. k(n) is chosen to be large when the signal is not busy locally and small when the signal is busy. Typically, k≧1 and k~1~40.

ii. f$_M$(n) obtained stays within a desired range of f$_M$(n).

iii. In typical applications, k(n) is used as side information for the signal recovery system. So it is desirable for k(n) be represented with a small number of bits (or bandwidth).

Thus, in FIG. 5, scaling element 64 selects an initial scaling factor k'(n), such that the value $$[f_H(n) \cdot k'(n)] + f_{AM}(n) \qquad (5)$$

lies within a desired range of f$_M$(n). Then, in the subsampler 66, the minimum value of k within a local block (e.g., 2×2, 4×4, etc.) of samples is chosen and used over the block. The subsampled modulation factor is then quantized by quantizer 68 to yield a signal k$_Q$(n). In one preferred embodiment, this quantizer value, k$_Q$(n), is transmitted as side information for use in signal recovery. Finally, interpolator 10 interpolates k$_Q$(n) (e.g., by bilinear interpolation) to yield k(n).

Figure 6:
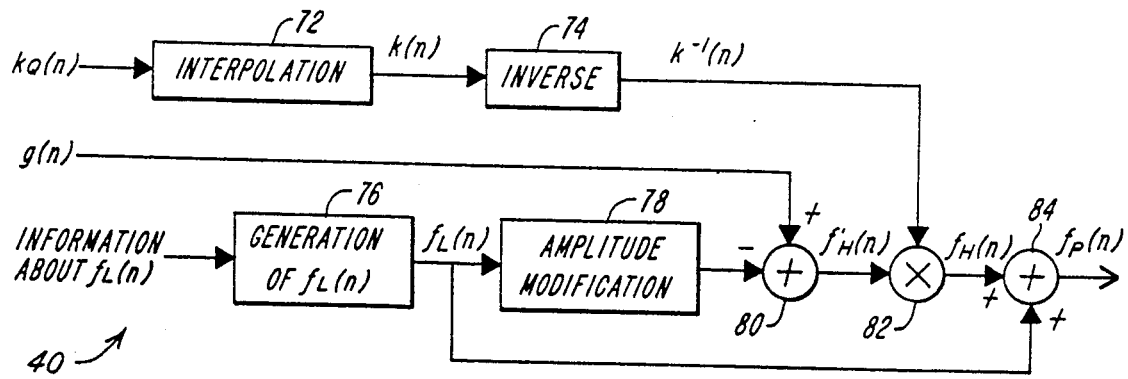
FIG. 6 is a detailed block diagram of a luminance reconstructing receiver for use in the system of FIG. 1

In FIG. 6, the luminance reconstruction module 40 of the receiver 14 (as shown in FIG. 1) is illustrated in more detail. During transmission, the signal f$_M$(n) is degraded by various causes. The degraded signal g(n) is one input to module 40. In an extended definition receiver (or playback unit) another input is the signal scaling factor signal k$_Q$(n), which is interpolated by interpolator 72 to recover the scaling factor k(n). Inverter 74 then generates the inverse function k$^{-1}$(n).

At the same time, the module 40 also extracts side information used to represent f$_L$(n). If the side information available is f$_{LSQ}$(n), as described above in connection with FIG. 3, then f$_L$(n) can simply be recovered by interpolation in low frequency signal generator 76. Amplitude modifier 78 serves to equilibrate the dynamic range compression introduced in the transmitter and, thus, calibrate the low frequency component which is subtracted in summer 80 from the degraded signal g(n). The resulting output of summer 80 is the scaled, high frequency component signal and channel-induced noise.

To this output signal, the inverse scaling factor k$^{-1}$(n) is applied in multiplier 82 to yield a noise-suppressed replicate of the high frequency signal f$_H$(n). In the final stage, summer 84 adds the low and high frequency components f$_L$(n) and f$_H$(n) to recovery, a nearly noiseless reconstruction f$_p$(n) of the original data signal f(n).

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense. In addition to the specific application to NTSC luminance values discussed herein, the present invention can be applied to chrominance values, as well as other television systems, such as PAL (Western Europe) SECAM (Eastern Europe) and other extended definition or high definition transmission and/or recording systems. The invention can also be used for R, G, B, components separately in a video processing environment or to audio or other data signals. Moreover, the decomposition means of the present invention can perform multiple decompositions to provide a low frequency signal and a plurality of higher frequency signals permitting more than one level of modulation.

What is claimed is:

1. An apparatus for combatting degradation of data signals, the apparatus comprising:
   decomposition means for decomposing a data signal into a low frequency signal and at least one high frequency signal;
   variance measurement means for measuring the local variance of data values in said high frequency signal;
   scaling means for modifying the high frequency signal by application of a series of scaling factors over selected regions in response to the local variance of data values in said regions to produce a modified high frequency signal;
   summing means for summing said low frequency signal and said modified high frequency signal to yield a modulated facsimile of the data signal, and
   means for transmitting or storing said modulated facsimile and data representative of said scaling factors to permit reconstruction of the data signal and concomitant reduction in signal degradation by application of a series of inverse scaling factors.

2. The apparatus of claim 1 wherein the decomposition means further comprises a low pass filtering means for filtering said data signal to obtain the low frequency signal and a computation means for deriving the high frequency signal by subtraction of said low frequency signal from the unfiltered data signal.

3. The apparatus of claim 1 wherein the scaling means further includes means for calculating said scaling factors based on the dynamic range of said high and low frequency signals, as well as the local variance of data values in the high frequency signal.

4. The apparatus of claim 1 wherein the apparatus further includes an amplitude modifying means for compressing the dynamic range of said low frequency signal prior to construction of the modulated facsimile of the data signal.

5. The apparatus of claim 1 wherein the apparatus further includes
   means for sampling and quantizing said low frequency signal, and
   means for transmitting or storing data representative of the sampled, quantized low frequency signal, together with said modulated facsimile and said scaling factor data.

6. The apparatus of claim 1 wherein the data signal comprises television luminance values.

7. A method of combating degradation of data signals, a method comprising the steps of:
   composing a data signal into a low frequency signal and at least one high frequency signal;
   measuring the local variance of data values in such high frequency signal;
   modifying the high frequency signal by application of a series of scaling factors over selected regions in response to the local variance of data values in certain regions to produce a modified high frequency signal; and
   summing said low frequency signal and said modified high frequency signal yield a modulated facsimile of the data signal, such that said modulated facsimile can be used to reconstruct the data signal with a concomitant reduction in signal degradation by application of a series of inverse scaling factors.

8. The method of claim 7 wherein the step of decomposing the data signal further comprises filtering said data signal to obtain said low frequency signal and deriving the high frequency signal by subtracting said low frequency signal from the unfiltered data signal.

9. The method of claim 7 wherein the step of modifying the high frequency signal further includes calculating said scaling factors based on the dynamic range of said high and low frequency signals, as well as the local variance of data values in the high frequency signal.

10. The method of claim 7 wherein the method further includes compressing the dynamic range of said low frequency signal prior to construction of the modulated facsimile.

11. The method of claim 7 wherein the method further includes transmitting or storing said modulated facsimile.

12. The method of claim 11 wherein the method further includes transmitting or storing data representative of said scaling factors and a subsampled, quantized version of the low-frequency signal, together with said modulated facsimile.

* * * * *